United States Patent [19]

Lun

[11] Patent Number: 4,881,712
[45] Date of Patent: Nov. 21, 1989

[54] HYDRAULIC MOUNT

[75] Inventor: Saiman Lun, Englewood, Ohio

[73] Assignee: General Motors Corporation, Detroit, Mich.

[21] Appl. No.: 209,394

[22] Filed: Jun. 21, 1988

[51] Int. Cl.$^4$ ............................................. F16M 7/00
[52] U.S. Cl. .................... 248/562; 248/631; 248/636; 248/638
[58] Field of Search ............... 248/562, 636, 638, 659, 248/631; 267/140.1

[56] References Cited

U.S. PATENT DOCUMENTS

| | | |
|---|---|---|
| 2,705,118 | 3/1955 | Beck . |
| 3,137,466 | 6/1984 | Rasmussen ........................ 248/562 |
| 3,679,159 | 7/1972 | Bach et al. ........................ 248/562 |
| 4,262,886 | 4/1981 | Le Salver et al. ............. 248/562 X |
| 4,351,515 | 9/1982 | Yoshida ........................ 248/562 X |
| 4,572,321 | 2/1986 | Morita . |
| 4,610,421 | 9/1986 | Ohta et al. . |
| 4,679,759 | 7/1987 | Ford .................................. 248/562 |
| 4,679,777 | 7/1987 | Gold et al. ..................... 248/562 X |
| 4,693,491 | 9/1987 | Akatsu et al. ................. 248/562 X |

Primary Examiner—Alvin C. Chin-Shue
Attorney, Agent, or Firm—R. L. Phillips

[57] ABSTRACT

A hydraulic engine mounting system for a vehicle engine includes a pair of engine mount assemblies having elastomeric bodies including two longitudinally aligned integral engine mounts. The mounts are in fluid communication with one another via an integral orifice track molded as a groove at the interface between the elastomeric body and a mating base plate. The engine mount assembly is mounted on a vehicle frame such that the common axis of the hydraulic chambers is situated transversely to the torque axis of the engine. During operation, the engine pitches about this torque axis. The pitching action of the engine causes one end mount to compress forcing hydraulic fluid along the orifice track into the other mount. The other mount simultaneously expands and receives this excess fluid. Advantageously, the flow of fluid along the orifice track produces a damping effect of the motion and vibration to provide isolation from the vehicle frame. A torque strut is mounted between the engine and the frame, to prevent excessive engine pitching motion, completing the system.

4 Claims, 1 Drawing Sheet

HYDRAULIC MOUNT

TECHNICAL FIELD

The present invention relates generally to a hydraulic mount for engine damping and, more specifically, to a hydraulic engine mounting system for isolating vehicle engine/transmission vibrations from the vehicle frame, including torsional, pitching or rocking motion.

BACKGROUND OF THE INVENTION

A variety of engine/transmission mounts and mounting systems for isolating vehicle engine vibration and torsional motion during vehicle operation have been developed. U.S. Pat. No. 2,705,118 to Beck discloses a mounting system including two separate hydraulic mounts each including an elastomer body forming hydraulic damping chambers. These mounts are positioned on the opposite sides of a vehicle engine to support the engine and isolate motion of the engine from the frame. The mounts are in fluid communication with one another through an external piping and adjustable orifice valve arrangement. It is the restricted flow of fluid through the piping which provides the desired degree of vibration and torsional damping. The hydraulic mounts themselves produce only minimal damping effect without this external fluid connection. Because of the remote nature of the mounts requiring relative long connecting piping, proper tuning of the system requires careful adjustment of the valves. This also complicates the installation, and increases the cost of the system. Because the piping is external, it is also prone to damage through accident, improper maintenance or the like.

U.S. Pat. No. 4,572,321 to Morita discloses a hydraulic mounting system including two hydraulic mounts having upper and lower fluid filled chambers. The mounts are oppositely positioned on the engine, and here again are intended to isolate the engine vibration and rocking motions from the vehicle frame. This system also requires external piping and an external control valve requiring at least one pressure signal input from the vehicle suspension system to control the engine rocking.

U.S. Pat. No. 4,610,421 to Ohta et al. discloses a mounting system for an engine/transmission assembly including four mounts. Two spaced mounts are provided on the pitching axis of the engine, but are not connected. These mounts include upper and lower fluid filled chambers. The flow of fluid between the chambers within each mount may be made variable by a solenoid means to provide variable damping. Operation of these mounts requires vehicle suspension and engine motion inputs through a control system, necessarily increasing system complexity and expense.

A need exists therefore for an improved hydraulic mount system to dampen vibration and, in particular, the torsional pitching or rocking motion of vehicle engine/transmission assemblies. The mount assembly of the system would be self contained, require no external controller and be relatively economical to implement.

SUMMARY OF THE INVENTION

Accordingly, it is a primary object of the present invention to provide a hydraulic mount system to dampen vibration, and particularly the torsional motion, of vehicle engines overcoming the limitations and disadvantages of the prior art.

Another object of the present invention is to provide a hydraulic mount assembly to dampen torsional pitching motion of an engine and associated vibrational forces.

Yet another object of the present invention is to provide a hydraulic engine mount assembly designed to damp torsional motion and being an integral unit that is highly versatile and readily adapted to a variety of engine applications.

Yet another object of the present invention is to provide a hydraulic engine mount assembly incorporating dual mounts coupled together in a compact unit so as to have minimum weight and minimum space requirements.

Still another object of the present invention is to provide a hydraulic engine mounting system to isolate the engine and its associated torsional or pitching motions during operation which is highly efficient, but simple and relatively easy and economical to install.

Additional objects, advantages, and other novel features of the invention will be set forth in part in the description that follows and in part will become apparent to those skilled in the art upon examination of the following, or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a hydraulic mounting system is provided for damping the torsional or pitching motion of an engine during vehicle operation. The mounting system employs a pair of elongated engine mount assemblies; one assembly positioned at each end of the engine and mounted transversely to the engine axis. Each assembly includes dual engine mounts integrally formed in an elongated elastomeric body and coupled by an orifice track, also integrally formed in the body.

The engine mounts of each assembly are substantially equally spaced on opposite sides of the engine torque axis so as to provide efficient torsional damping. In other words, each mount assembly is installed in the vehicle such that its longitudinal axis (common axis of the engine mounts) is aligned substantially perpendicularly to the torque axis of the engine. The torque axis is by definition the theoretical axis about which the engine pitches during torsional loading.

The hydraulic engine mounting system of the present invention is particularly well suited for use with front wheel drive vehicles having a transversely mounted engine/transaxle assembly; although it is to be understood, that the system is also well adapted for use with longitudinally mounted engines for rear wheel drive vehicles.

Because the engine mount assemblies are self contained and highly compact, each can be installed in areas with limited space. Advantageously, this feature of being compact also helps in maintaining the weight at a minimum.

During vehicle operation, as the vehicle is accelerated and decelerated, the engine pitches about the torque axis. As it pitches in a first direction for example, the first engine mount is compressed. The fluid contained within the hydraulic chamber is incompressible and therefore, is forced or pumped along the orifice track into the second engine mount. The second engine mount stretches from the action of the engine and its expansion allows this excess fluid to be received. The orifice track adds the flow resistance to the passage of fluid between the mounts. This resistance provides the damping action of the torsional motion of the engine.

Upon reversal of the torsional motion, the engine pitches in the opposite direction, forcing the second engine mount to contract and the first engine mount to expand. Here again, the orifice track adds frictional resistance to the fluid flow, providing hydraulic damping action. This damping action thus serves to isolate the torsional motion from the vehicle frame, thereby providing a smoother feeling ride and improving vehicle and engine control. The inherent resiliency of the elastomeric, fluid-filled engine mounts assists in providing cushioning, and thus isolation of the other engine vibrations; in most cases, negating any requirement for additional engine mounts.

The orifice track is advantageously formed as an integral part of the elastomeric body as an open groove between the mounts. The groove is closed to form the orifice track by the base plate, thus placing the orifice track at the interface between the two parts. The ease of fabrication is improved and the cost of manufacture is significantly reduced. The orifice track can be readily tuned to particular vehicle requirements by the cross sectional size, surface texture, the track configuration and the length.

To complete the hydraulic mounting system, a pivotal torque strut or link is provided spaced from the torque axis. The strut secures the engine to a stationary frame member, preferably adjacent the top, thus preventing excessive engine pitching. The torque strut and the engine mount assemblies work in concert with one another to maximize the isolation of all engine movement from the frame.

Advantageously, the engine mount assembly provides a high degree of damping to torsional loading, yet retains vertical spring rates substantially similar to high efficiency engine mounts now in use for vibration isolation only. Thus, the desirable vibration damping need not be sacrificed.

The size of the mounts may be varied to suit the particular vehicle and engine application. The hydraulic mount system because of these features and the integral design can be easily and economically adapted to a wide range of vehicles, and provide maximum damping performance under most conditions.

Still other objects of the present invention will become apparent to those skilled in this art from the following description when they are shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawings.

DETAILED DESCRIPTION OF THE INVENTION

Figure 1:
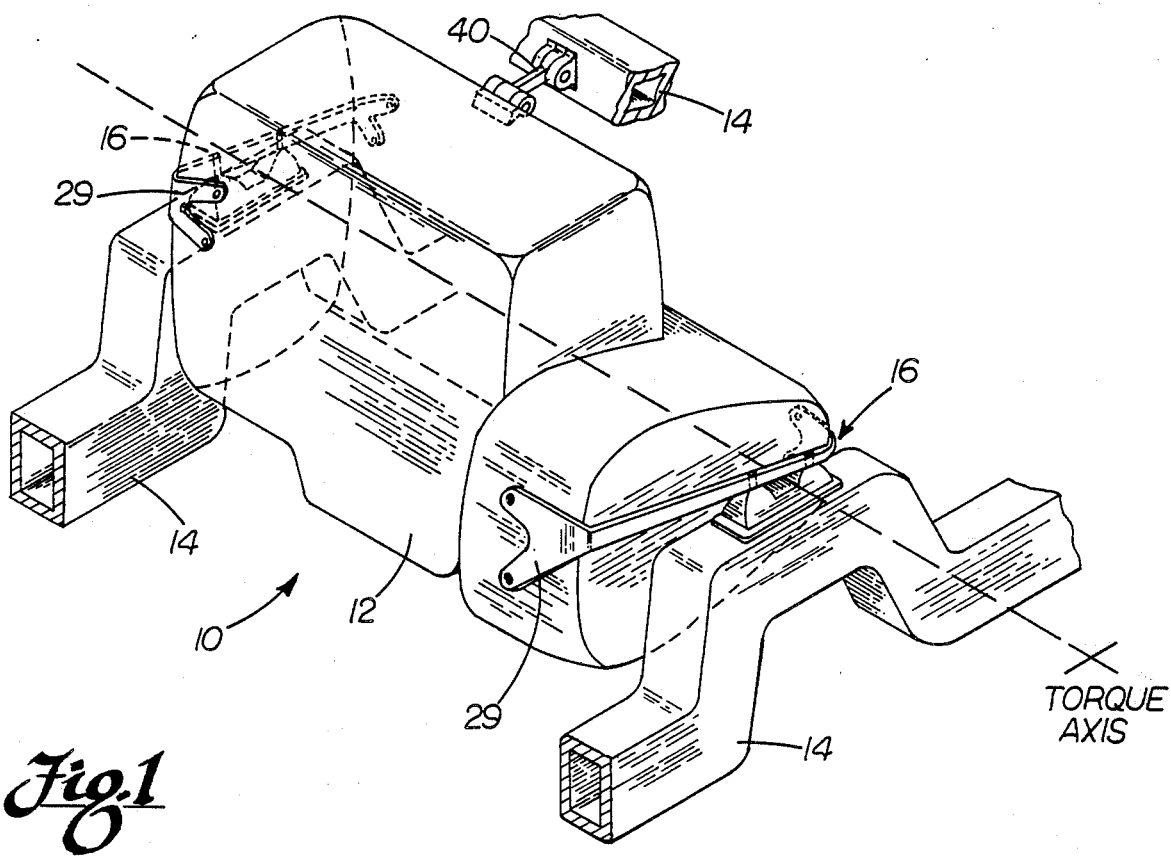
FIG. 1 is a perspective view of the hydraulic mounting system of the present invention showing an engine including a transaxle supported by the engine mounts assemblies of the present invention.

Reference is now made to FIG. 1 showing a hydraulic engine mounting system 10 and illustrating the preferred embodiment adapted for mounting a transverse engine 12 including a transaxle, as found in front wheel drive cars. A pair of engine mount assemblies 16 are provided to isolate the vibration/torsional motion of the engine 12 from the vehicle frame 14. The two engine mount assemblies 16 are identical to one another so that only one needs to be specifically discussed.

Figure 2:
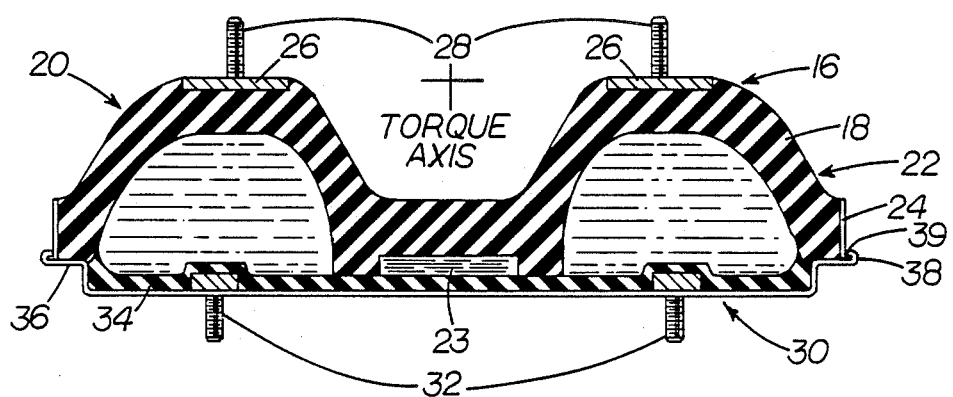
FIG. 2 is a cross sectional view of an engine mount assembly used in the hydraulic mounting system of the present invention.

The engine mount assembly 16 comprises first and second sub-assemblies. The first sub-assembly includes an elastomeric body 18 as shown in FIG. 2. This body 18 is fabricated of natural or synthetic rubber and is flexible. The body 18 defines first and second engine mounts 20 and 22, respectively. These mounts 20, 22 are filled with a damping liquid which may be a commercial engine antifreeze/coolant.

Figure 3:
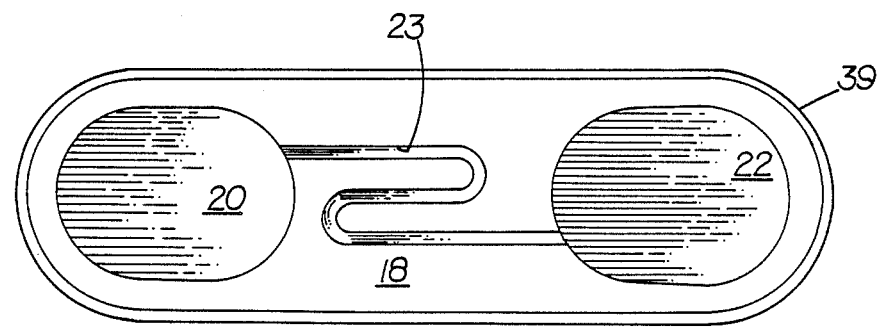
FIG. 3 is a plan view of the operative inner face of the body of an engine mount assembly of the present invention; the base plate having been removed for clarity.

As shown in FIG. 3, an integral orifice track 23 is provided to direct a flow of damping fluid between the engine mounts 20 and 22. This flow of fluid dampens torsional motions of the engine 12 during vehicle operation. Orifice track sizes and shapes are variable to adapt the engine mount assembly 16 to a wide variety of vehicle and engine applications.

In the preferred embodiment, orifice track 23 is an open groove molded into the inner face of the elastomeric body 18. As will be described in more detail below, the groove defining the orifice track 23 is then closed simply by attaching a base plate to the body 18. This simplifies construction since the track 23 is formed at the interface between the two parts and integral to the mount assembly. Installation in the vehicle is simplified since the track 23 is self-contained.

The body 18 is surrounded on its periphery by a retainer 24. The retainer 24 is fabricated of sheet metal or other rigid material and is provided to strengthen the body 18. Molded within the body 18 are mounting members 26 including mounting studs 28. As shown in FIG. 1, mounting brackets 29 are provided to securely attach the engine mount assembly 16 to the engine 12.

The second sub-assembly of the engine mount assembly 16 includes sheet metal base plate 30. Base plate 30 includes studs 32 for attachment to the vehicle frame 14. As shown in FIG. 2, an elastomeric liner 34 covers the inner side of the base plate 30 and cooperates with elastomeric body 18 to close the engine mounts 20, 22, as well as orifice track 23. The base plate 30 includes rim 36 to engage and support the upper sub-assembly. The rim 36 terminates in a rolled lip 38 to engage rim portion 39 provided on the retainer 24. This retains the two sub-assemblies together, creating the integral, one piece mount assembly 16. This helps minimize weight and simplify vehicle installation.

As shown in FIG. 1, the two engine mount assemblies 16 are positioned on the frame members 14 such that their common axis is substantially perpendicular to the torque axis of the engine 12. As is known in the art, the engine 12 pitches about this axis during operation. The placement of the engine mount assemblies 16 in relation to the torque axis is further illustrated in FIG. 2, the torque axis being perpendicular to the plane of the drawing. Advantageously, this transverse placement results in very efficient torsional damping.

During vehicle operation, as the driver accelerates and decelerates the vehicle, the engine 12 pitches about this torque axis. Additionally, the engine 12 pitches to a lesser extent during idle and other low load operation. As the engine 12 pitches or rocks in a first direction, the first engine mount 20 compresses under the torsional load. Simultaneously, the second mount 22 is stretched. Because the hydraulic fluid is incompressible, it is forced out of the first engine mount 20 into the orifice track 23. The fluid continues along orifice track 23 and enters the second engine mount 22. Advantageously, the orifice track 23 adds frictional resistance to the flow of fluid. This resistance provides the damping action of the mount 16.

Upon reversal of the pitching motion, the engine 12 pitches in a second direction away from the first engine mount 20, towards the second engine mount 22. This has the effect of compressing the second mount 22 and stretching the first mount 20. This forces fluid back through the orifice track 23 and into the first mount 20. Here again, the orifice track 23 adds resistance to the fluid flow, thereby damping the pitching motion of the engine.

To complete the hydraulic mounting system 10, a pivotal torque strut or link 40 is provided spaced from the torque axis to secure the engine 12. The dual pivotal connection is adjacent the top of the frame 14 (or other stationary vehicle member), preventing excessive pitching of the engine 12. The torque strut 40 is comprised of a single rigid piece vibrationally isolated from the engine 12 and the frame 14 by rubber bushings or the like (not shown). The torque strut 40 and the engine mount assemblies 16 work in concert to maximize the isolation of the engine 12 movements from the frame 14. This assures optimum vehicle ride characteristics while maintaining excellent engine control.

The overall or net effect of the engine mount assemblies 16 is to provide high damping and a low torsional dynamic rate. Advantageously, the assemblies 16 have a vertical spring rate substantially similar to the high efficiency mounts currently in use for vibration isolation only. This allows the hydraulic mounting system 10 to be easily engineered into vehicles of current design without resorting to additional means of increasing the vertical spring rate or conversely, sacrificing desirable vibration damping.

In summary, numerous benefits result from employing the concepts of the present invention. The hydraulic mounting system 10 employs two engine mount assemblies 16 to dampen vibrations including primarily the torsional pitching motion of the engine 12. The engine mount assemblies 16 include dual engine mounts 20 and 22 in damping fluid communication through the integral orifice track 23. Because the orifice track 23 and the engine mounts, 20, 22 are integral, the mount assembly 16 can be readily installed in limited clearance areas, a decided advantage in the crowded engine compartments found in modern vehicles. Advantageously, the orifice track 23 is formed at the interface between the elastomeric body 18 and the support base plate 30. The engine mount assembly 16 with the integral dual mounts 20, 22 and orifice track 23 is well adapted for use in a wide variety of vehicle applications.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a decoupler can be provided in fluid communication between the engine mounts 20 and 22 in addition to the orifice track 23. In this way, damping flow along the orifice track 23 would only occur after a decoupler amplitude limit has been exceeded. This decouples low frequency vibrations. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

I claim:

1. A self contained hydraulic mount assembly for torsional damping of a vehicle engine or the like on the frame of the vehicle, said engine having a torsion axis, comprising:

first and second mounting members;

said first member being connected to said engine and the second member to the frame of the vehicle;

a singular elongated elastomeric body including first and second longitudinally aligned spaced, integral, flexible engine mounts, each of said engine mount connected to a first and second mounting members;

each said engine mount having a chamber defined in part by said elastomeric body;

said engine mounts including their respective said chambers located adjacent to and with said first mount on one side and said second mount on the opposite side of said torsion axis;

an integral orifice track in said body for providing restricted hydraulic fluid flow between said chambers;

whereby upon operation of said engine said first and second engine mounts are compressed and expanded to effect forced exchange of hydraulic fluid along said orifice track between said chambers to provide damping of the vibration and the torsional motion of the engine, thereby providing isolation from the frame.

2. The self contained hydraulic mount assembly of claim 1, wherein there is provided a separate base plate closing said chambers in said body, said orifice track connecting said mounts being formed as a groove along the interface between said body and said plate.

3. A self contained hydraulic mounting system for mounting a vehicle engine or the like to the frame of the vehicle, said engine having a torsion axis, comprising:

a pair of engine mounting brackets extending transversely to and connected to said engine; first and second mounting members; said first member being connected to the mounting bracket and the second member to the frame of the vehicle, and at least two engine mount assemblies, each engine mount assembly being mounted between one of said mounting brackets and said vehicle frame, said engine mount assemblies including a singular elastomeric body having first and second longitudinally aligned spaced, flexible, integral engine mounts, each said engine mount having a chamber defined in part by said elastomeric body, said engine mounts including their respective said chambers located adjacent to and with said first mount on one side and said second mount on the opposite side of said torsion axis and an integral orifice track providing restricted fluid communication between said first and second mounts each said engine mount connected to a first and second mounting members;

whereby during vehicle engine operation the vibration and torsional motion of said engine is isolated from said vehicle frame by a forced flow of fluid between said first and second engine mounts of said engine mount assembles.

4. The hydraulic mounting system of claim 3 wherein there is provided a torque strut pivotally attached to said engine spaced from the torsional axis and to said vehicle frame;

whereby, said hydraulic mount assemblies cooperate with said torque strut during vehicle operation to dampen and isolate the vibration and torsional motion of said engine from said vehicle frame.

* * * * *